(12) United States Patent
Daftardar

(10) Patent No.: US 7,945,730 B2
(45) Date of Patent: May 17, 2011

(54) SYSTEMS AND METHODS FOR RECOVERING FROM CONFIGURATION DATA MISMATCHES IN A CLUSTERED ENVIRONMENT

(75) Inventor: Jayant M. Daftardar, Lawrenceville, GA (US)

(73) Assignee: LSI Corporation, Milpitas, CA (US)

( * ) Notice: Subject to any disclaimer, the term of this patent is extended or adjusted under 35 U.S.C. 154(b) by 981 days.

(21) Appl. No.: 11/559,280

(22) Filed: Nov. 13, 2006

(65) Prior Publication Data

US 2008/0115008 A1  May 15, 2008

(51) Int. Cl.
*G06F 11/00* (2006.01)

(52) U.S. Cl. .......................... 711/114; 714/6

(58) Field of Classification Search .............. 711/114; 714/6
See application file for complete search history.

(56) References Cited

U.S. PATENT DOCUMENTS

| | | | | |
|---|---|---|---|---|
| 5,950,230 | A * | 9/1999 | Islam et al. | 711/156 |
| 6,289,398 | B1 * | 9/2001 | Stallmo et al. | 710/5 |
| 6,578,158 | B1 * | 6/2003 | Deitz et al. | 714/11 |
| 7,444,541 | B2 * | 10/2008 | Lubbers et al. | 714/5 |
| 2002/0116660 | A1 * | 8/2002 | Duchesne et al. | 714/7 |
| 2002/0133735 | A1 * | 9/2002 | McKean et al. | 714/5 |

* cited by examiner

*Primary Examiner* — Jared I Rutz
(74) *Attorney, Agent, or Firm* — Duft Bornsen & Fishman LLP

(57) ABSTRACT

Apparatus and methods are provided for recovering from mismatching configuration data in a clustered environment having a plurality of storage devices coupled to a plurality of storage controllers. If a clustered environment has a first storage device of the plurality of storage devices that has first configuration data that does not match second configuration data of a second storage device of the plurality of storage devices, then the mismatch may be resolved through operation of the clustered environment rather than through operator intervention. Comparison of relevant attributes of the first and second configuration data determines whether a relevant difference between the first and second configuration data is a physical status of at least one of the plurality of storage devices. If the relevant difference is the physical status of at least one of the plurality of storage devices, then the mismatch may be resolved between the first and second configuration data, and normal operation of the clustered environment may continue.

20 Claims, 5 Drawing Sheets

SYSTEMS AND METHODS FOR RECOVERING FROM CONFIGURATION DATA MISMATCHES IN A CLUSTERED ENVIRONMENT

BACKGROUND OF THE INVENTION

1. Field of the Invention

The invention relates to storage subsystem architectures and in particular to a storage controller in a clustered environment that is able to recover from a configuration data mismatch.

2. Discussion of Related Art

Clustered environments are used to improve speed and reliability over that provided by a single server. Clustered environments typically consist of a plurality of physical machines (e.g., nodes), and may additionally consist of a plurality of storage devices, such as hard drives. Reliability may be improved by providing redundant processing and storage of data within the clustered environment. Thus, multiple nodes (e.g., servers) provide reliability on the processing side, while multiple storage devices provide reliability for data storage. All of the devices may be linked together, such that data may be redundantly written to multiple storage devices, while multiple nodes may have access to the redundant data on multiple storage devices. For example, in a Redundant Arrays of Independent Disks ("RAID") 1 mirror configuration, two storage devices may store mirror images of the same logical volume. Thus, when one storage device is updated, the other storage device is updated as well.

There are many different configurations in a clustered environment. One such configuration is an active-active configuration, where two nodes operate at the same time to process two requests in parallel (e.g., the first node processes one request, while the second node processes another request). Both nodes then write data related to the two separate requests to the same set of storage devices.

Another configuration in a clustered environment is an active-passive configuration. In an active-passive configuration, the active node processes requests for the clustered environment and writes data to the redundant storage devices. The passive node waits idle in case the active node is unable to continue processing for any reason (e.g., a power failure or hung condition), and then switches to an active mode and assumes the duties of the active node.

One such duty includes updating configuration data of the clustered environment. All of the storage devices, as well as the nodes, may store configuration data regarding the number of logical drives, the number of physical drives, the RAID level, stripe size, cache policy, etc., of the clustered environment. As storage devices fail, power on or off, or go online or offline, the configuration data of the clustered environment is updated on each of the remaining available storage devices. For example, if power is lost to some of the storage devices, then the storage devices are no longer available. The physical status of the powered off storage devices is changed in the configuration data of the remaining online storage devices by the active node storage controller to reflect the new offline physical status. Once the storage devices are powered back on, the physical status in the configuration data of the storage devices is changed accordingly by the active node storage controller to reflect the availability of the storage devices.

A problem arises when configuration data among the multiple devices becomes mismatched, and the active node is unable to resolve the difference. Once this situation occurs, the clustered nodes may be unable to resolve the discrepancy and may need to suspend processing until an operator reconfigures the configuration data and thus manually resolves the mismatch.

Consider for example an active-passive configuration in which the active node is responsible for updating configuration data of the clustered environment on the storage devices. Assume that a portion of the storage devices receive power from the same shared power supply as one of the nodes (e.g., the passive node). If a power outage occurs on the shared power supply, then the node, as well as a portion of the storage devices connected to the shared power supply will no longer be online. The active node (e.g., the node still powered on) will detect the loss of the other node and a portion of the storage devices, and update the configuration data on the remaining online storage devices to reflect that some of the storage devices have failed. When power is restored to the passive node, offline storage devices are powered up as well. The storage devices are "spun up" and ready for operation well before the passive node completes its power up initialization process. The active node is normally still operational and updates a copy of the configuration data on each recently powered up storage device, as well as the other storage devices, to reflect the new online physical status of the recently powered on storage devices. Thus, when the passive node completes its initialization and compares configuration data on each of the connected storage devices, the configuration data will be consistent among all of the storage devices.

However, if the active node is in a hung condition or otherwise not operable to update configuration data on recently powered up storage devices, then a configuration data mismatch may occur. When the passive node later initializes and compares configuration data on each of the connected storage devices, the configuration data is not consistent, and the passive node is not able to resolve the mismatch. The clustered environment then enters a hung condition, and needs to wait for operator intervention before proceeding with normal operation again. This downtime can be costly in a variety of high demand applications. For example, when clustered environments are deployed for revenue sensitive applications, such as telecom billing, a downtime can translate directly to lost revenue.

It is evident from the above discussion that a need exists for an improved structure and method for recovering from configuration data mismatches in a clustered environment.

SUMMARY OF THE INVENTION

The present invention solves the above and other problems, thereby advancing the state of the useful arts, by providing apparatus and methods for recovering from a configuration data mismatch among a plurality of storage devices within a clustered environment. Thus, when a storage controller of a clustered environment determines that one or more storage devices have conflicting configuration data, then the storage controller may resolve the mismatch by applying features and aspects hereof. The clustered environment may then continue operation without waiting for an operator to intervene and manually resolve the mismatching configuration data.

One aspect hereof is a method for recovering from mismatching configuration data in a clustered environment having a plurality of storage devices coupled to a plurality of storage controllers. The method comprises determining that a first storage device of the plurality of storage devices has first configuration data that does not match second configuration data of a second storage device of the plurality of storage devices; comparing relevant attributes of the first and second configuration data to determine whether a relevant difference is a physical status of at least one of the plurality of storage devices; and resolving the mismatch between the first and second configuration data to recover from the mismatched configuration data if the relevant difference is the physical status of at least one of the plurality of storage devices.

Another aspect hereof is a method for recovering from mismatching configuration data in a clustered environment having a plurality of storage devices coupled to a plurality of RAID storage controllers, wherein the plurality of storage controllers comprises an active storage controller and a passive storage controller. The method comprises: determining that a first storage device of the plurality of storage devices has first configuration data that does not match second configuration data of a second storage device of the plurality of storage devices; determining that the active storage controller has failed to update the configuration data of the plurality of storage devices; comparing through operation of the passive storage controller relevant attributes of the first and second configuration data to determine whether a relevant difference is a physical status of at least one of the plurality of storage devices; resolving through operation of the passive storage controller the mismatch between the first and second configuration data if the relevant difference is the physical status of at least one of the plurality of storage devices; and synchronizing through operation of the passive storage controller the first and second configuration data.

Another aspect hereof is a storage controller comprising: an interface coupled to a plurality of storage devices in a clustered environment; a controller adapted to determine that a first storage device of the plurality of storage devices has first configuration data that does not match second configuration data of a second storage device of the plurality of storage devices, and the controller is further adapted to compare relevant attributes of the first and second configuration data to determine whether a relevant difference is a physical status of at least one of the plurality of storage devices, and the controller is further adapted to resolve the mismatch between the first and second configuration data to recover from the mismatched configuration data if the relevant difference is the physical status of at least one of the plurality of storage devices.

BRIEF DESCRIPTION OF THE DRAWINGS

The same reference number represents the same or similar element on all drawings.

DETAILED DESCRIPTION OF THE DRAWINGS

Figure 1:
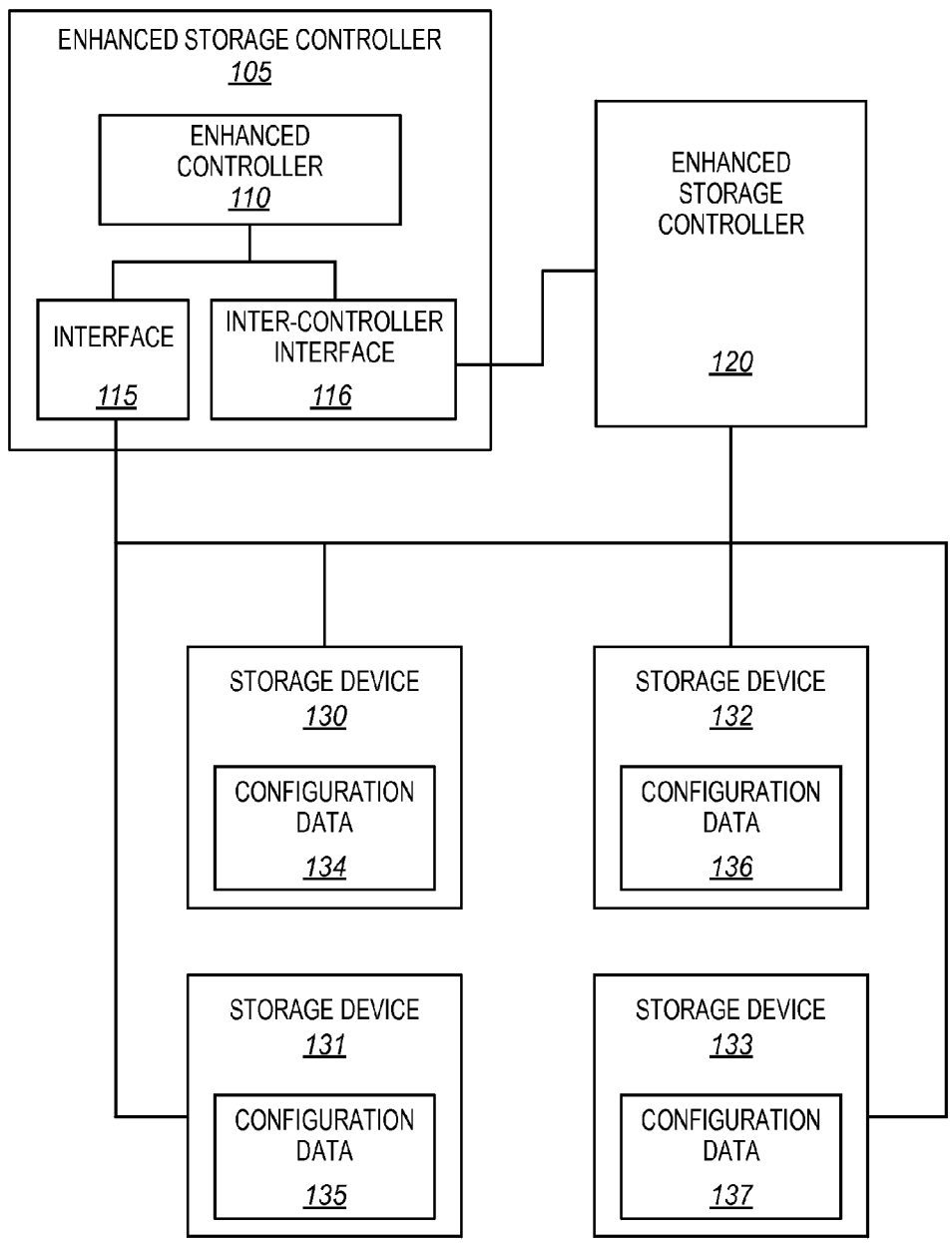
FIG. 1 is a block diagram of an exemplary clustered environment including a storage controller embodying features and aspects hereof to provide recovery from mismatching configuration data on a plurality of storage devices of the clustered environment.

FIG. 1 illustrates an exemplary embodiment of a clustered environment comprising a plurality of storage controllers 105 and 120 enhanced according to features and aspects hereof.

Clustered environment 100 further comprises a plurality of storage devices 130, 131, 132 and 133. As discussed above, a clustered environment is generally operable to provide redundant data processing as well as redundant data storage. Thus, if one of the storage controllers or storage devices fails, then the clustered environment is able to continue operating with diminished capacity.

Each storage device 130-133 stores information and configuration data (e.g., configuration data 134-137) of clustered environment 100. Storage devices 130-133 for example may store information using any well known redundant storage management technique, such as mirroring the storage devices or RAID techniques such as RAID 5 or 6. Configuration data 134-137 includes information regarding the logical and physical configuration of storage devices 130-133 used within clustered environment 100. Exemplary configuration data 134-137 of clustered environment 100 includes the number of logical drives, the number of physical drives, the storage management technique (e.g., the RAID level), stripe size, and the cache policy of clustered environment 100.

Storage controller 105 comprises an interface 115 coupled to storage devices 130-133. Information and configuration data may be transferred from storage controller 105 by interface 115 to storage devices 130-133 through a wired connection or may be transferred through a wireless connection. Storage controller 105 further comprises inter-controller interface 116 coupled to storage controller 120. Inter-controller interface 116 transfers data between storage controller 105 and storage controller 120. Any of a variety of well known commercially available interfaces and associated protocols may be used as a matter of design choice including for example, Ethernet, Fibre Channel, USB, Firewire and other wired and wireless media and interfaces.

Storage controller 105 also comprises an enhanced controller 110 enhanced according to features and aspects hereof to provide management of configuration data and recovery from mismatching configuration data 134-137 within clustered environment 100. Storage controller 120 may be configured similarly to storage controller 105, with a controller and interface (not shown). Storage controller 105 may be part of a standalone storage system, such as a storage controller within the standalone storage system, or may be part of a host system (not shown) of clustered environment 100, such as a host adapter board within the host system.

During operation of clustered environment 100, various operating parameters of clustered environment 100 may change, such as the physical and logical configuration of storage devices 130-133. As the configuration of clustered environment 100 changes, storage controller 105 and/or storage controller 120 may update configuration data 134-137 of storage devices 130-133 to reflect the new configuration data of clustered environment 100. For example, if one or more of storage devices 130-133 fail or otherwise go offline, then configuration data 134-137 of the remaining storage devices may be updated accordingly to reflect the failed status of the failed storage devices.

A problem arises when one or more of storage devices 130-133 are storing different configuration data 134-137. For example, configuration data 134 of storage device 130 may be different then configuration data 136 of storage device 132. As long as a configuration data 134 and configuration data 136 describe the same type of storage system of clustered environment 100 (e.g., same logical and physical configuration), then storage controller 105 may be able to resolve the mismatch if a relevant difference is limited to information that storage controller 105 may determine without operator intervention, such as physical statuses of storage devices 130-133.

Thus, storage controller 105 may be able to compare relevant attributes of configuration data 134 and 136 to determine relevant differences between configuration data 134 and 136. If the relevant differences are limited to the physical status of one or more of the storage devices 130-133, then storage controller 105 is able to resolve the mismatch without operator intervention. Otherwise, operation of clustered environment 100 may be suspended until an operator resolves the mismatching configuration data.

Figure 2:
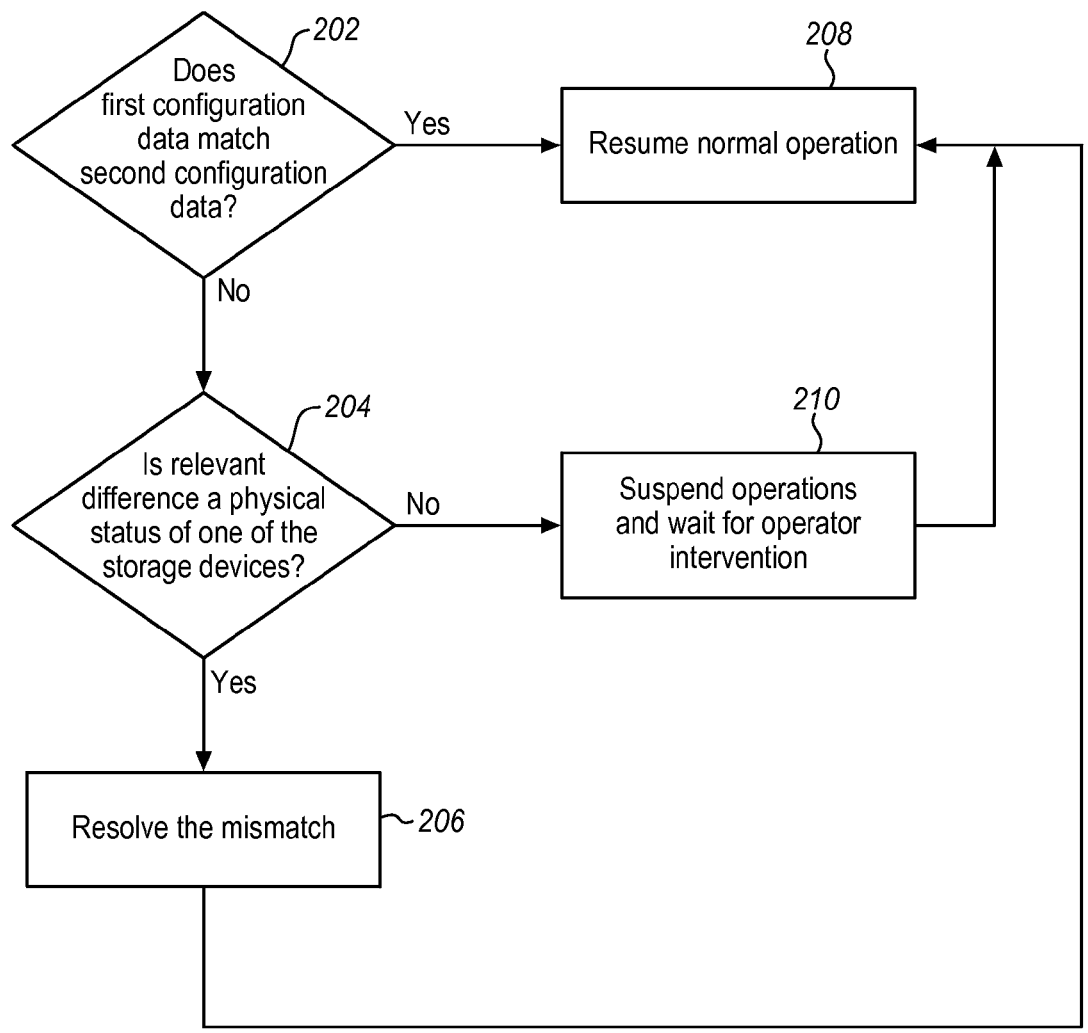
FIG. 2 is a flowchart describing an exemplary method in accordance with features and aspects hereof to provide recovery from mismatching configuration data on a plurality of storage devices of a clustered environment.

FIG. 2 is a flowchart illustrating an exemplary method embodying features and aspects hereof to provide recovery from mismatching configuration data in a clustered environment (e.g., clustered environment 100) having a plurality of storage devices coupled to a plurality of storage controllers.

Element 202 is operable to determine whether a first storage device of the plurality of storage devices has first configuration data that does not match second configuration data of a second storage device of the plurality of storage devices. Element 202 may be operable, for example, by a RAID storage controller of the clustered environment.

Element 202 may be operable at any point at which a storage controller needs to retrieve configuration data from one or more of the storage devices within the clustered environment. For example, the storage controller may start up and retrieve configuration data from the plurality of storage devices. The storage controller may further compare the retrieved configuration data to verify that all of the storage devices are storing the same configuration data. From the comparison, the storage controller may determine that the configuration data of the plurality of storage devices does not match. For example, half of the storage devices may have configuration data that is different from the other half of the storage devices.

If operation of element 202 determines that the first configuration data matches the second configuration data, then element 208 is operable to resume normal operations of the clustered environment (e.g., transferring stored information between a storage device and a host system).

If operation of element 202 determines that the first configuration data is different than the second configuration data, then element 204 is operable to compare relevant attributes of the first and second configuration data to determine whether a relevant difference is a physical status of at least one of the plurality of storage devices. For example, the first configuration data may define a physical status of a third storage device of a logical volume as failed, while the second configuration data may define the physical status of the same third storage device of the same logical volume as available.

If operation of element 204 determines that the relevant difference is not the physical status of one or more of the plurality of storage devices, then element 210 is operable to suspend processing of the clustered environment and wait for operator intervention. For example, the first configuration data may define the storage management technique of the clustered environment as RAID 1, while the second configuration data may define the storage management technique as RAID 5. In this situation, the difference between the first and second configuration data may not be resolved by the clustered environment without the risk of data corruption (e.g., data may be overwritten on one or more storage devices). Thus, the storage controller may suspend operations and allow an operator to resolve the mismatch, for example, by operation of a configuration utility on a host system.

If operation of element 204 determines that the relevant difference is the physical status of one or more of the plurality of storage devices, then element 206 is operable to resolve the mismatch.

For example, as discussed above, the relevant difference may be limited to the physical status of the third storage device of a storage volume. Element 208 may then operate to determine the physical status of the third storage device (e.g., by querying the third storage device for its physical status). Once the physical status of the third storage device is determined, the mismatch between the first and second configuration data is resolved by replacing the mismatching information in the first and second configuration data with the correctly determined physical status information.

To prevent data corruption within the clustered environment, the method illustrated in FIG. 2 may compare various relevant attributes in accordance with desired design criteria when determining relevant differences between configuration data stored on two or more storage devices (e.g., a first and second storage device). Exemplary relevant attributes may include a number of logical drives, a number of physical storage devices, a physical status of the plurality of storage devices and a storage management technique defined by the configuration data. Operation of element 204 ensures that a storage controller does not modify attributes of configuration data that may lead to corruption of information stored on the plurality of storage devices. For example, if a difference between the first and second configuration data includes a logical volume configuration (e.g., different logical volumes are defined in the first and second configuration data), then it may not be desirable to allow the storage controller to resolve the difference and possibly allow overwriting of data on one or more logical drives. Or, for example, if a difference between the first and second configuration data includes a storage management technique (e.g., a RAID level), then it may not be desirable to allow the storage controller to resolve the difference and possibly allow use of a different storage management technique within the clustered environment. Thus, if the first configuration data defines a RAID 1 level storage management technique and the second configuration data defines a RAID 5 level storage management technique, then the storage controller could possibly improperly overwrite data on one or more storage devices by selecting either of the storage management techniques.

However, certain configuration data of the clustered environment, such as physical statuses of the plurality of storage devices, may be determined by the storage controller without the possibility of data corruption. For example, the storage controller may determine the physical status of each storage device by querying the storage device, and storage controllers already track the physical status of storage devices during normal operation. Resolving a discrepancy in the physical status of a device is cannot cause data corruption of the data on that or other storage devices.

Figure 3:
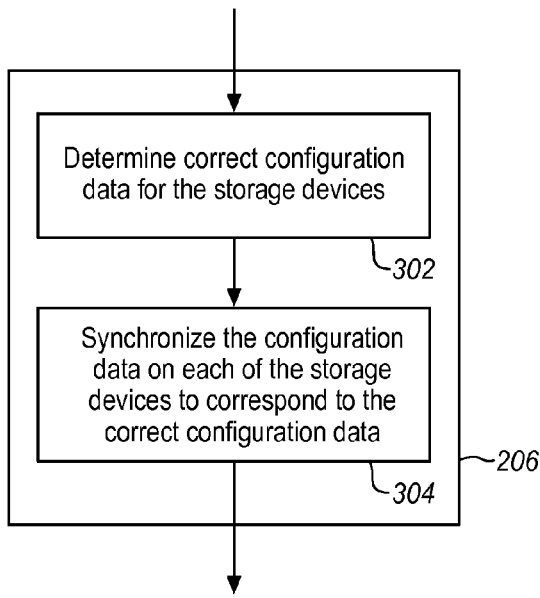
FIGS. 3-5 are flowcharts describing exemplary additional details of aspects of the method of FIG. 2.

FIG. 3 is a flowchart providing additional details of an exemplary embodiment of features and aspects hereof to permit recovery from mismatching configuration data in a clustered environment. FIG. 3 provides additional exemplary details of the processing of element 206 of FIG. 2. As noted above, element 206 is generally operable to resolve the mismatch between the first and second configuration data of the clustered environment.

Element 302 is operable to determine correct configuration data for the plurality of storage devices. For example, through comparison of the first and second configuration data, element 302 may determine attributes of the first and second configuration data that are the same. Further, element 302 may determine correct configuration data for the attributes that are different between the first and second configuration data (e.g., by querying storage devices). Element 302 is further operable to generate correct configuration data for the plurality of storage devices based on the determinations so made.

Element 304 is operable to synchronize the configuration data on each of the storage devices to correspond to the correct configuration data. For example, a storage controller 304 may store the correct configuration data on all of the storage devices to ensure that each storage device has matching configuration data for the clustered environment.

Figure 4:
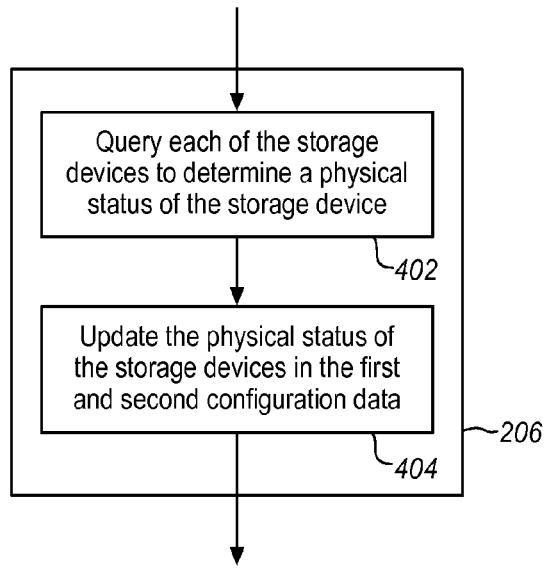

As discussed above, it may become necessary to determine correct configuration data (e.g., physical statuses of storage devices) through operation of the clustered environment. For example, a storage controller may need to query storage devices to determine and/or verify information regarding the storage device. FIG. 4 is a flowchart providing additional details of an exemplary embodiment of features and aspects hereof to permit recovery from mismatching configuration data in a clustered environment. FIG. 4 provides additional exemplary details of the processing of element 206 of FIG. 2. As noted above, element 206 is generally operable to resolve the mismatch between the first and second configuration data.

Element 402 is operable to query each of the plurality of storage devices to determine a physical status of each of the storage devices. Thus, the configuration data may have updated physical statuses (e.g., available or failed) for all of the storage devices.

Element 404 is operable to update the physical status of the storage devices in the first and second configuration data. Since the relevant difference was determined to be the physical status of one or more of the storage devices, then the rest of the configuration data may not need updating or synchronizing. Further, element 404 may optionally operate to update the physical status of the plurality of storage devices defined in the configuration data of all of the plurality of storage devices to ensure that all of the plurality of storage devices are using synchronized and updated configuration data.

As discussed above, there may be situations where a portion of the storage devices in a clustered environment fail, for example during a power outage. Thus, the remaining online storage devices may store more recently updated configuration data indicating a failure of the portion of the storage devices due to the power outage. A clustered environment may use this knowledge to determine which of a first and second configuration data is more recent, and use the more recent configuration data as a basis for generating current configuration data. However, it is not generally desirable for the clustered environment to use configuration data having only a more recent timestamp. Though the timestamp may suggest one is more recent, the configuration data may be from a different clustered environment or have a different logical or volume configuration than the earlier configuration data.

Figure 5:
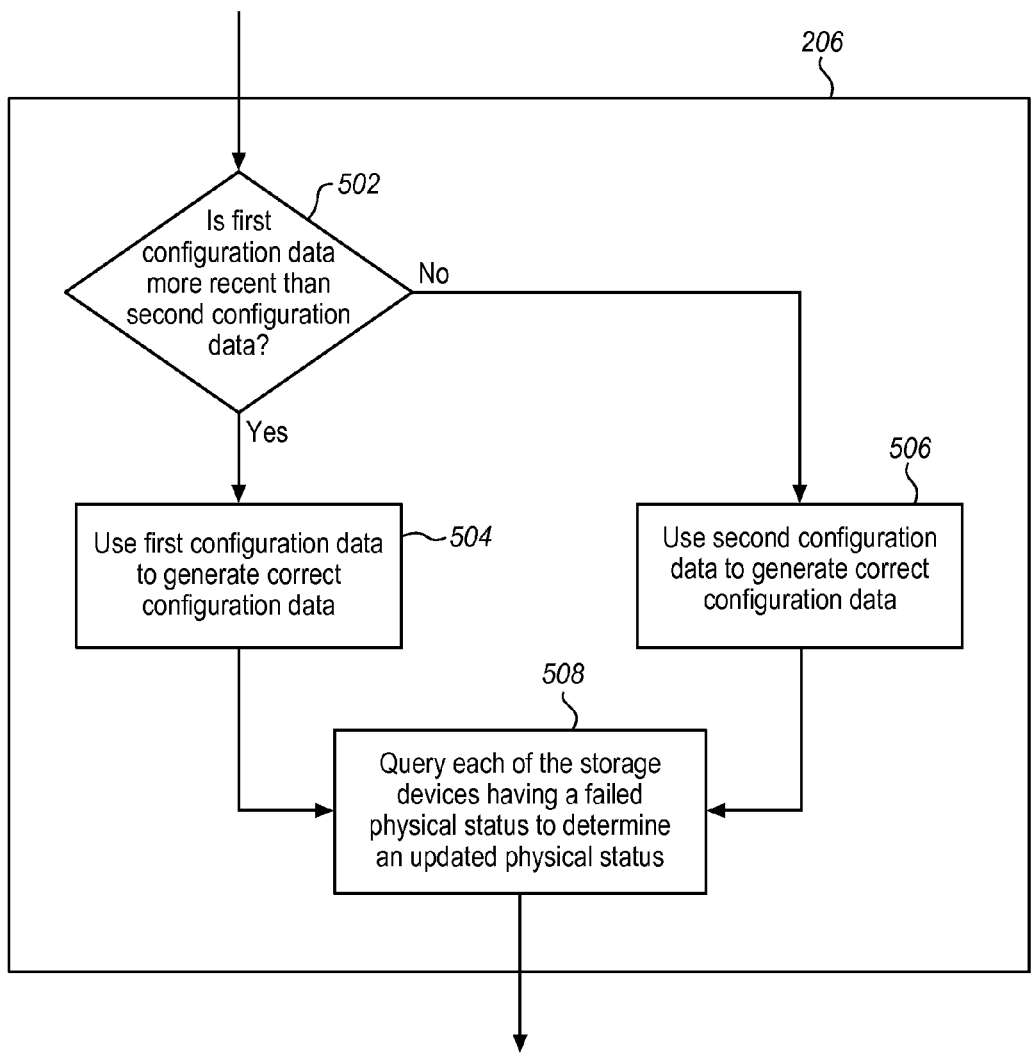

FIG. 5 is a flowchart providing additional details of an exemplary embodiment of features and aspects hereof to permit recovery from mismatching configuration data in a clustered environment. FIG. 5 provides additional exemplary details of the processing of element 206 of FIG. 2. As noted above, element 206 is generally operable to resolve the mismatch between the first and second configuration data.

The method of FIG. 5 requires that the relevant difference is a physical status of one or more of the plurality of storage devices. Otherwise, data corruption may occur if the more recent configuration data defines a different clustered environment than the second configuration data (e.g., different logical configuration or storage management technique). Element 502 is operable to determine which of the first and second configuration data is more recent by comparing a sequence number of the first and second configuration data. If operation of element 502 determines that the first configuration data is more recent, then operation of element 504 selects the first configuration data for use by the clustered environment. The first configuration data may then be used as a basis for operation of element 508. If operation of element 502 determines that the second configuration data is more recent, then operation of element 506 selects the second configuration data for use by the clustered environment. The second configuration data may then be used as a basis for operation of element 508. Element 508 uses the selected more recent configuration data as a basis for generating correct configuration data. Element 508 is operable to query each of the storage devices having a failed physical status in the selected configuration data to determine an updated physical status of the failed storage devices.

Element 510 is operable to update the physical status of the plurality of storage devices in the first and second configuration data based on the physical statuses determined by the querying step.

For example, if a first storage device of the plurality of storage devices shuts off due to a power failure, then second configuration data of a second storage device that remains online may be updated to reflect the failed status of the first storage device. Subsequently, the first storage device may come back online, and if the configuration data is not updated accordingly, then the first configuration data of the first storage device may reflect an online status for the first storage device, while the second configuration data may reflect a failed status for the first storage device. Since the second configuration data may have a more recent sequence number, the second configuration data may be used as a starting point for generating correct configuration data for the clustered environment. Thus, rather than querying each storage device to determine an updated physical status, element 508 may query the first storage device having a failed status to determine the updated physical status of the first storage device. Subsequently, correct configuration data may be generated using the updated physical status of the first storage device.

In an active-passive configuration in a clustered environment, an active storage controller is typically responsible for updating configuration data on the plurality of storage devices. One particular instance of mismatching configuration data is likely to occur when some of the storage devices, as well as one or more of the storage controllers, lose power. Subsequently, the configuration data of the remaining available storage devices may be updated accordingly by the remaining available storage controller (e.g., the now active storage controller) to reflect that the powered off storage devices now have a failed status. However, as discussed above, if the active storage controller is subsequently unable to update configuration data when the failed storage devices come back online, then the recently powered on storage controller (e.g., the passive storage controller) may encounter mismatching configuration data, and may need to resolve the mismatch before operation of the clustered environment may continue.

Figure 6:
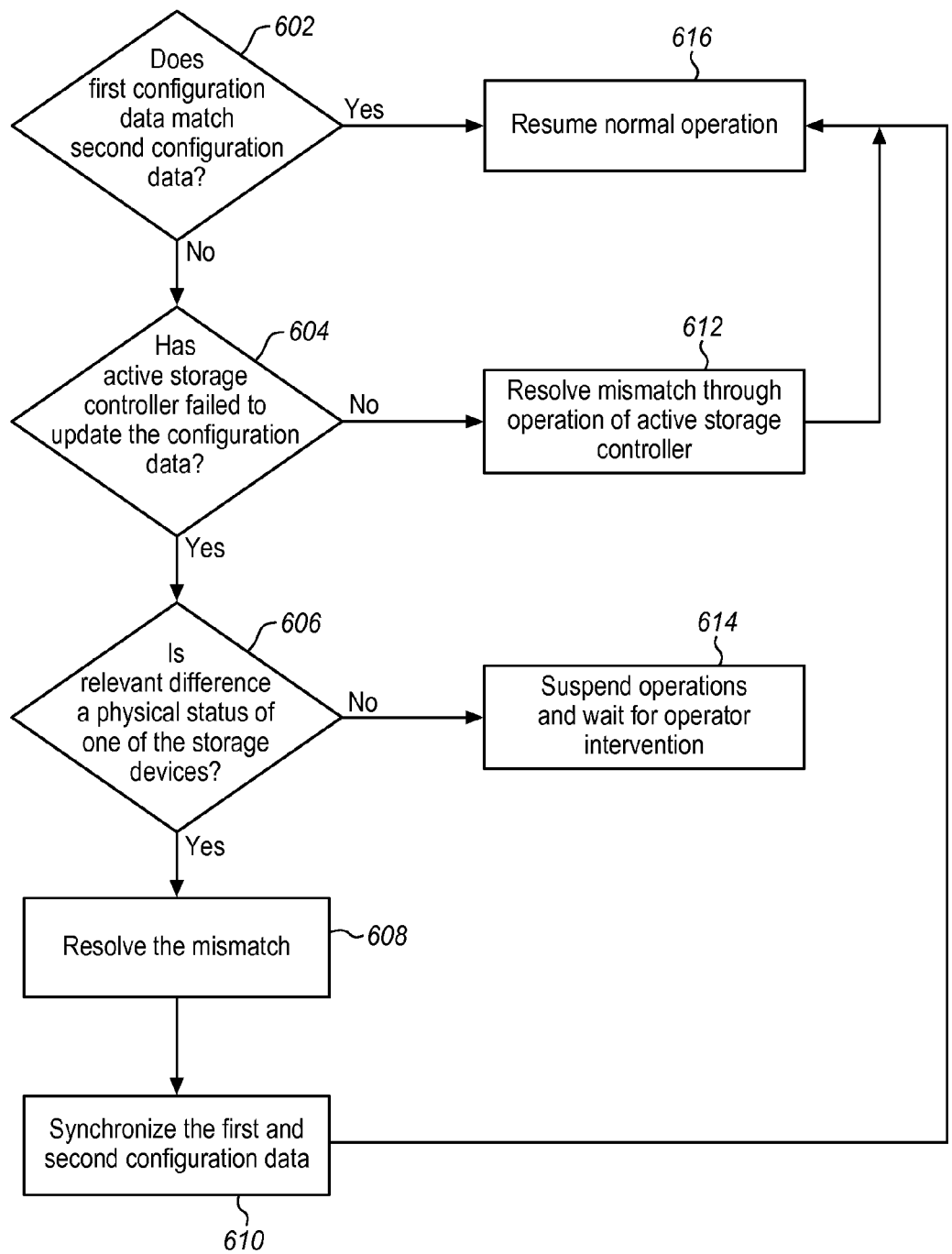
FIG. 6 is a flowchart describing another exemplary method in accordance with features and aspects hereof to provide recovery from mismatching configuration data on a plurality of storage devices of a clustered environment.

FIG. 6 is a flowchart illustrating another exemplary method for recovering from mismatching configuration data in a clustered environment (e.g., clustered environment 100) having a plurality of storage devices coupled to a plurality of storage controllers. The plurality of storage controllers comprises an active storage controller and a passive storage controller. More specifically, FIG. 6 illustrates a method in which a passive storage controller may determine that an active storage controller has failed to update configuration data of the plurality of storage devices, and the mismatch is resolved through operation of the passive storage controller.

Element 602 is operable to determine whether a first storage device of the plurality of storage devices has first configuration data that does not match second configuration data of a second storage device of the plurality of storage devices. For example, the passive storage controller may start up and retrieve configuration data from the plurality of storage devices. The storage controller may further compare the retrieved configuration data to verify that all of the storage devices are storing the same configuration data. From the comparison, the storage controller may determine that the configuration data of the plurality of storage devices does or does not match (e.g., the first configuration data does or does not match the second configuration data).

If operation of element 602 determines that the first configuration data matches the second configuration data, then element 616 is operable to resume normal operations of the clustered environment (e.g., transferring stored information between a storage device and a host system).

If operation of element 602 determines that the first configuration data is different than the second configuration data, then element 604 is operable to determine whether the active storage controller has failed to update the configuration data.

If operation of element 604 determines that the active storage controller has not failed to update the configuration data, then element 612 is operable to resolve the mismatch through operation of the active storage controller. For example, the active storage controller may be in the process of updating the configuration data on the plurality of storage devices, and the passive storage controller may allow the active storage controller to finish the process. Once operation of element 612 is complete, normal operations of the clustered environment are resumed by element 616.

If operation of element 604 determines that the active storage controller has failed to update the configuration data on the plurality of storage devices, then element 606, through operation of the passive storage controller, is operable to compare relevant attributes of the first and second configuration data to determine whether relevant differences are limited to a physical status of at least one of the plurality of storage devices. For example, the first configuration data may define a physical status of a third storage device as failed, while the second configuration data may define the physical status of the third storage device as online.

If operation of element 606 determines that the relevant differences are not limited to the physical status of one or more of the plurality of storage devices, then element 614 is operable to suspend processing of the clustered environment and wait for operator intervention. Other configuration differences cannot be automatically resolved and so require manual intervention.

If operation of element 606 determines that the relevant differences are limited to the physical status of one or more of the plurality of storage devices, then element 606, through operation of the passive controller to resolve the mismatch. Element 606 may use a variety of techniques as discussed above to resolve the mismatch.

Element 610, through operation of the passive controller, synchronizes the first and second configuration data. Once the synchronization process is complete, normal operation of the clustered environment may be resumed by element 616. If the active controller is unable to continue processing of the clustered environment, then the passive controller may be optionally enabled to enter an active mode and assume duties of the active controller that is now unable to continue processing of the clustered environment.

Those of ordinary skill in the art will readily recognize a wide variety of equivalent method steps to provide similar functionality to that described above with respect to FIGS. 2 through 6. The flowcharts illustrated in FIG. 2-6 are not all inclusive, and may include other well known steps not shown for the sake of brevity of the discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

I claim:

1. A method for recovering from mismatching configuration data in a clustered environment having a plurality of storage devices coupled to a plurality of storage controllers, wherein one of the storage controllers is an active controller and one or more other storage controllers are passive controllers, wherein the active controller maintains configuration data, the method comprising:

detecting, by operation of the passive controller, that the active controller has failed;

determining, by operation of the passive controller, that a first storage device of the plurality of storage devices has first configuration data that does not match second configuration data of a second storage device of the plurality of storage devices;

comparing, by operation of the passive controller, relevant attributes of the first and second configuration data to determine whether a relevant difference is a physical status of at least one of the plurality of storage devices and to determine that the mismatch comprises only attributes relating to configuration that cannot cause data corruption; and automatically resolving, by operation of the passive controller, the mismatch between the first and second configuration data to recover from the mismatched configuration data if the relevant difference is the physical status of at least one of the plurality of storage devices and the mismatch comprises only attributes relating to configuration that cannot cause data corruption, wherein the resolving step further comprises:

comparing sequence numbers of the first and second configuration data to determine which of the first and second configuration data is more recent;

using the physical status of the more recent of the first and second configuration data to generate correct configuration data for the plurality of storage devices.

2. The method of claim 1 wherein the relevant difference is determined by comparing relevant attributes comprising logical volume configuration data defined by the first and second configuration data.

3. The method of claim 1 wherein the relevant difference is determined by comparing relevant attributes comprising physical volume configuration data defined by the first and second configuration data.

4. The method of claim 1 wherein the relevant difference is determined by comparing relevant attributes comprising a number of logical drives, a number of physical storage devices, the physical status of the plurality of storage devices and a storage management technique defined by the first and second configuration data.

5. The method of claim 1 wherein the resolving step further comprises:
synchronizing the first and second configuration data.

6. The method of claim 1 wherein the resolving step further comprises:
synchronizing the configuration data on each of the plurality of storage devices to correspond to the correct configuration data.

7. The method of claim 1 wherein the resolving step further comprises:
querying each of the plurality of storage devices to determine a physical status of the storage device; and
updating the physical status of the plurality of storage devices in the first and second configuration data based on the physical statuses determined by the querying step.

8. The method of claim 1 wherein the resolving step further comprises:
querying each of the plurality of storage devices having a failed physical status in the correct configuration data to determine a physical status of the failed storage device; and
updating the physical status of the plurality of storage devices in the first and second configuration data based on the physical statuses determined by the querying step.

9. The method of claim 1 wherein the resolving step further comprises:
determining a physical status of each of the plurality of storage devices;
generating current configuration data of the plurality of storage devices; and
updating the configuration data of each of the plurality of storage devices to correspond to the current configuration data.

10. The method of claim 1 wherein the plurality of storage controllers comprises an active storage controller and a passive storage controller, and the method further comprises:
determining that the active storage controller has failed to update the configuration data of the plurality of storage devices and wherein the step of resolving is performed by operation of the passive storage controller.

11. A method for recovering from mismatching configuration data in a clustered environment having a plurality of storage devices coupled to a plurality of Redundant Arrays of Independent Disks ("RAID") storage controllers, wherein the plurality of storage controllers comprises an active storage controller and a passive storage controller, wherein the active controller maintains the configuration data, the method comprising:
determining, by operation of the passive controller, that a first storage device of the plurality of storage devices has first configuration data that does not match second configuration data of a second storage device of the plurality of storage devices;
determining, by operation of the passive controller, that the active storage controller has failed to update the configuration data of the plurality of storage devices;
comparing through operation of the passive storage controller relevant attributes of the first and second configuration data to determine whether a relevant difference is a physical status of at least one of the plurality of storage devices and to determine that the mismatch comprises only attributes relating to configuration that cannot cause data corruption;
automatically resolving through operation of the passive storage controller the mismatch between the first and second configuration data if the relevant difference is the physical status of at least one of the plurality of storage devices and the mismatch does comprises only attributes relating to configuration that cannot cause data corruption; and
synchronizing through operation of the passive storage controller the first and second configuration data,
wherein the resolving step further comprises:
comparing sequence numbers of the first and second configuration data to determine which of the first and second configuration data is more recent;
using the physical status of the more recent of the first and second configuration data to generate correct configuration data for the plurality of storage devices.

12. The method of claim 11 wherein the relevant difference is determined by comparing relevant attributes comprising logical volume configuration data defined by the first and second configuration data.

13. The method of claim 11 wherein the relevant difference is determined by comparing relevant attributes comprising physical volume configuration data defined by the first and second configuration data.

14. The method of claim 11 wherein the relevant difference is determined by comparing relevant attributes comprising a number of logical drives, a number of physical storage devices, the physical status of the plurality of storage devices and a storage management technique defined by the first and second configuration data.

15. A passive storage controller coupled with an active storage controller, the passive storage controller comprising:
an interface coupled to a plurality of storage devices in a clustered environment;
an enhanced controller adapted to determine that the active storage controller has failed, the enhanced controller further adapted to determine that a first storage device of the plurality of storage devices has first configuration data that does not match second configuration data of a second storage device of the plurality of storage devices, the enhanced controller further adapted to compare relevant attributes of the first and second configuration data to determine whether a relevant difference is a physical status of at least one of the plurality of storage devices, the enhanced controller further adapted to resolve the mismatch between the first and second configuration data to recover from the mismatched configuration data if the relevant difference is the physical status of at least one of the plurality of storage devices and the mismatch comprises only attributes relating to configuration that cannot cause data corruption,
wherein the enhanced controller further adapted to resolve the mismatch by comparing sequence numbers of the first and second configuration data to determine which of the first and second configuration data is more recent, and
wherein the enhanced controller is further adapted to resolve the mismatch by using the physical status of the more recent of the first and second configuration data to generate correct configuration data for the plurality of storage devices.

16. The passive storage controller of claim 15 wherein the controller is further adapted to determine the relevant difference by comparing relevant attributes comprising logical volume configuration data defined by the first and second configuration data.

17. The passive storage controller of claim 15 wherein the controller is further adapted to determine the relevant difference by comparing relevant attributes comprising physical volume configuration data defined by the first and second configuration data.

18. The passive storage controller of claim 15 wherein the controller is further adapted to determine the relevant difference by comparing relevant attributes comprising a number of logical drives, a number of physical storage devices, the physical status of the plurality of storage devices and a storage management technique defined by the first and second configuration data.

19. The passive storage controller of claim 15 wherein the storage controller is a Redundant Arrays of Independent Disks ("RAID") controller.

20. The passive storage controller of claim 15 wherein the controller is further adapted to synchronize the first and second configuration data.

* * * * *